United States Patent [19]
Shah et al.

[11] Patent Number: 6,153,746
[45] Date of Patent: Nov. 28, 2000

[54] PROCESS FOR MAKING A CYCLODEXTRIN

[75] Inventors: Bharat K. Shah, East Lyme; Constantine Sklavounos, Waterford, both of Conn.

[73] Assignee: Pfizer Inc., New York, N.Y.

[21] Appl. No.: 09/106,983

[22] Filed: Jun. 29, 1998

Related U.S. Application Data

[60] Provisional application No. 60/051,497, Jul. 1, 1997.

[51] Int. Cl.$^7$ ........................................................ C07H 1/00
[52] U.S. Cl. .............................................. 536/103; 514/58
[58] Field of Search ................................ 514/58; 536/103

[56] References Cited

U.S. PATENT DOCUMENTS

| | | |
|---|---|---|
| 3,426,011 | 2/1969 | Parmerter et al. . |
| 5,134,127 | 7/1992 | Stella et al. .............................. 514/58 |
| 5,376,645 | 12/1994 | Stella et al. .............................. 514/58 |

FOREIGN PATENT DOCUMENTS

| | | | |
|---|---|---|---|
| 9111172 | 8/1991 | WIPO ............................. | A61K 9/00 |
| 9402518 | 2/1994 | WIPO ............................. | C08B 37/16 |

OTHER PUBLICATIONS

Rajewski et al. "Preliminary Safety Evaluation of Parenterally Administered Sulfoalkyl Ether β–Cyclodextrins Derivatives", *J. Pharm. Sci*, vol. 84(8):927–932.

*Primary Examiner*—Howard C. Lee
*Attorney, Agent, or Firm*—Peter C. Richardson; Gregg C. Benson; James T. Jones

[57] ABSTRACT

Sulfoalkyl ether cyclodextrins are produced by a process of treating an unsubstituted cyclodextrin starting material with an alkyl sultone in the presence of a base. The base is added in a stepwise, pH controlled manner so that substantially the entire initial charge of cyclodextrin starting material is at least partially reacted. Additional base is then added to complete the reaction, and residual alkyl suftone is destroyed. The product advantageously contains low levels of both residual cyclodextrin and residual alkyl sultone.

17 Claims, No Drawings

PROCESS FOR MAKING A CYCLODEXTRIN

The priority date of U.S. provisional application Ser. No. 60/051,497 filed Jul. 1, 1997 is claimed.

FIELD OF THE INVENTION

This invention relates to a process for making sulfoalkyl ether cyclodextrins and also to the cyclodextrins themselves.

BACKGROUND OF THE INVENTION

Cydodextrins, sometimes referred to as Schardinger's dextrins, were first isolated by Villiers in 1891 as a digest of *Bacillus amylobacter* on potato starch. The foundations of cydodextrin chemistry were laid down by Schardinger in the period 1903–1911. Until 1970, however, only small amounts of cyclodextrins could be produced in the laboratory and the high production cost prevented the usage of cyclodextrins in industry. In recent years, dramatic improvements in cyclodextrin production and purification have been achieved and cyclodextrins have become much less expensive, thereby making the industrial application of cyclodextrins possible.

Cyclodextrins are cyclic oligosaccharides with hydroxyl groups on the outer surface and a void cavity in the center. Their outer surface is hydrophilic, and therefore they are usually soluble in water, but the cavity has a lipophilic character. The most common cyclodextrins are α-cyclodextrin, β-cyclodextrin and γ-cyclodextrin, consisting of 6, 7 and 8 α-1,4-linked glucopyranose units, respectively. Thus cyclodextrins have the general formula:

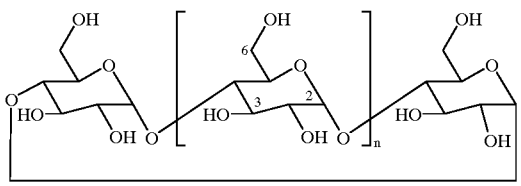

wherein n is 4, 5, or 6. The number of these units determines the size of the cavity. In the case of α-cyclodextrins, n is 4. For β- and γ-cyclodextrins, n is 5 and 6, respectively.

Cyclodextrins are capable of forming inclusion complexes with a wide variety of hydrophobic molecules by taking up a whole molecule (a "guest molecule"), or some part of it, into the void cavity. Common cyclodextrin derivatives are formed by alkylation (e.g., methyl-and-ethyl-β-cyclodextrin) or hydroxyalkylation of α-, β-, and γ-cyclodextrin or by substituting the primary hydroxyl groups with saccharides (e.g., glucosyl- and maltosyl-β-cydodextrin). Hydroxypropyl-β-cyclodextrin and its preparation by propylene oxide addition to β-cyclodextrin, and hydroxyethyl-β-cyclodextrin and its preparation by ethylene oxide addition to cyclodextrin, were described in a patent of Gramera et al. (U.S. Pat. No. 3,459,731, issued August 1969).

Although cyclodextrins have been used to increase the solubility, dissolution rate and/or stability of a great many compounds, it is also known that there are many drugs for which cyclodextrin complexation either is not possible or yields no advantages. See J. Szejtli, Cyclodextrins in Drug Formulations: Part II, Pharmaceutical Technology, 24–38, August, 1991.

U.S. Pat. No. 5,134,127 to Stella et al., herein incorporated by reference, discloses cyclodextrin derivatives wherein the glucopyranose units are substituted by (C₂₋₆alkylene)-SO₃ groups, herein referred to as sulfoalkyl ether cyclodextrins. The degree of substitution, calculated as the average number of sulfoalkyl ether groups per cyclodextrin ring, range from 1.2 to about 7. These cyclodextrins are advantageous, inter alia, because they possess a very low level of toxicity and a high aqueous solubility. They are suitable for use as clathrating agents with drugs to provide complexes which are useful in parenteral and other pharmaceutical formulations.

Sulfoalkyl ether cyclodextrins as disclosed in U.S. Pat. No. 5,134,127 are made by treating an unsubstituted (α-, β-, or γ-) cyclodextrin starting material with an alkyl sultone in the presence of a base. Residual cyclodextrin is undesirable since it is a known nephrotoxin. Residual alkyl sultone, an alkylating agent, is also toxic and it is accordingly desirable that residual alkyl sufltone levels be as low as possible, preferably essentially absent, in the crude and/or finished sulfoalkyl ether cyclodextrin product. A method which provided for low levels of both, and which otherwise allowed achieving low levels of other by- products, would be a useful addition to the cyclodextrin art.

DESCRIPTION OF THE INVENTION

Percentages as used herein, unless otherwise identified, mean "% by weight", w/w (weight by weight concentration) unless otherwise indicated.

This invention provides sulfoalkyl ether cyclodextrins containing less than 25 ppm of alkylsuftone and, simultaneously, less than 0.5% by weight of residual (i.e., unreacted) cydodextrin.

The present invention further provides an improved aqueous process for making sulfoalkyl ether cyclodextrins.

This invention provides a process of making a sulfoalkyl ether cyclodextrin having a predetermined degree of substitution (i.e., of sulfoalkyl ether groups), comprising the steps of combining in an aqueous reaction medium an (unsubstituted) cyclodextrin starting material and an alkyl sultone in an amount sufficient to effect said pre-determined degree of substitution, in the presence of a base to effect sulfoalkylation of said cyclodextrin;

maintaining the pH of the reaction medium basic but at a level less than about 11 during said sulfoalkylation for a time sufficient to consume said cyclodextrin such that residual unreacted cyclodextrin reaches a level of less than 0.5% by weight (based on the original weight of unsubstituted cyclodextrin starting material), preferably less than 0.1%, and;

adding base in an amount sufficient to effect completion of said sulfoalkylation, i.e., to said pre-determined degree of substitution.

A preferred additional step following said completion comprises adding additional base (hydroxide) in an amount and under conditions sufficient to effect destruction of residual alkylsultone, thereby providing a crude product having low residual alkylsultone, less than 25 ppm.

In a preferred embodiment, this invention provides a process of making a sulfoalkyl ether cyclodextrin having a pre-determined degree of substitution, comprising the steps of:

A) combining an unsubstituted cydodextrin starting material with an alkyl sultone in an amount sufficient to effect said pre-determined degree of substitution, in the presence of an alkali metal hydroxide;

B) conducting sulfoalkylation of said cyclodextrin within a pH range of about 8 to about 11 until residual unreacted cyclodextrin is less than 0.5% by weight, preferably less than 0.1%;

C) adding additional hydroxide in an amount sufficient to achieve said degree of substitution and allowing said sulfoalkylation to proceed to completion; and D) adding additional hydroxide to destroy residual sultone. This step is advantageously conducted using a quantity of hydroxide, and under conditions (i.e., amount of additional hydroxide added, temperature, length of time during which the sultone hydrolysis is conducted) such that the level of residual sultone in the aqueous crude product is reduced to less than 20 ppm.

After the reaction has been conducted as described above, the sulfoalkyl ether cyclodextrin aqueous medium is neutralized to a pH of about 7 to quench the reaction. The product can then be diluted with water to lower viscosity, particularly if further purification is to be conducted. Further purification steps are advantageously employed, including the use of diafiltration on an ultrafiltration unit to purge the reaction of by-products such as salts (e.g., NaCl if sodium hydroxide was employed as the base) and other low molecular weight by-products. The product can further be concentrated by ultrafiltration. The product solution can then be carbon treated to improve color and to reduce bioburden. The product can be isolated by a suitable drying technique such as freeze drying, spray drying, or vacuum drum drying.

The reaction can be initially prepared by dissolving an (unsubstituted) α-, β-, or γ-cyclodextrin starting material in an aqueous solution of base, usually a hydroxide such as lithium, sodium, or potassium hydroxide. The base is present in an amount which is stoichiometrically insufficient, relative to the amount of cyclodextrin, to achieve a pre-determined or desired degree of substitution. That is, the base is present in an amount less than one molar equivalent for each hydroxyl sought to be derivatized in the cyclodextrin molecule. Because cyclodextrins become increasingly soluble in aqueous solution as the temperature is raised, the aqueous reaction mixture containing base and cyclodextrin should be raised to a temperature of about 50° C. to ensure complete dissolution. Advantageously, agitation is employed throughout the course of the sulfoalkylation reaction.

After dissolution is complete the alkylsultone is added to start the sulfoalkylation reaction. The total amount of alkylsultone added throughout the reaction will generally be in excess of the stoichiometric amount required to complete the reaction relative to the amount of cyclodextrin since some of the alkylsultone is hydrolyzed and/or otherwise destroyed such that it is not available for use in the sulfoalkylation reaction. The exact amount of alkylsultone to use for a desired degree of substitution can be determined through the use of trial runs. The entire amount of alkyl sultone needed to complete the reaction is generally added prior to initiating the reaction. Because the system is aqueous, the reaction is generally conducted at a temperature between 50° C. and 100° C. The reaction preferably should be conducted at a temperature less than 100° C. so that specialized pressure equipment is not required. In general, a temperature of 65° C. to 95° C. is preferred.

During the initial phase of the reaction (herein referred to as the pH-control phase), care should be taken to monitor the pH and maintain it basic, preferably within the range of about 8 to about 11. Monitoring of pH can be effected conventionally as by using a standard pH meter. Adjustment of the pH can be effected by adding an aqueous solution of hydroxide, typically as a 10–15% solution. It is during this initial pH-control phase that residual unreacted cyclodextrin is reacted to the extent that less than 0.5% by weight, preferably less than 0.1% by weight, of unreacted cyclodextrin is left. Substantially the entire initial charge of cyclodextrin is thus reacted by being partially substituted, but to less than the desired pre-determined degree of substitution. Residual cyclodextrin can be monitored throughout this initial phase, for example by HPLC as described below, until a desired endpoint of less than 0.5%, preferably less than 0.1%, of residual cyclodextrin starting material, has been achieved. The pH can be maintained and/or raised by adding concentrated hydroxide to the reaction medium continuously or in discrete steps as small increments. Addition in small increments is preferred.

Once a sulfoalkylation procedure has been standardized or optimized so that it is known that particular amounts of reactants can be combined in a procedure which produces the desired degree of substitution in conjunction with low residual cyclodextrin, then the procedure can simply be checked at the end, as opposed to throughout or during the initial pH-control step, to ensure that a low level of residual (unreacted) cydodextrin starting material has been achieved.

It is noted that the initial pH of the reaction medium may be above 11, for example after combining the initial charge of cyclodextrin starting material and base, but prior to addition of alkyl sultone. Once alkyl sultone has been added and the reaction commences, however, the pH quickly drops, necessitating addition of base to maintain the pH basic in the 8–11 range.

Once the level of residual unreacted cyclodextrin has reached a desired level below 0.5% by weight during the pH control stage, the pH can be raised to above 11, for example a level above 12, by adding additional base to drive the reaction to completion. The pH is preferably at least 12 so that the reaction proceeds at a reasonable rate, but not so high that unreacted alkyl sultone is hydrolyzed rapidly rather than reacting with cyclodextrin. During this latter phase of the reaction, additional substitution of the cyclodextrin molecule is effected until the pre-determined degree of substitution has been attained. The total amount of hydroxide added throughout the reaction is typically on the order of the amount stoichiometrically required plus a 10–20% molar excess relative to the amount of alkyl sultone employed. The addition of more than a 10–20% excess is also feasible. The reaction end point, as noted above, can be detected by HPLC. Again, the preferred temperature range is 65° C. to 95° C. The HPLC system typically employs a C18 column used in reverse phase with pulsed amperometric detection (PAD). Elution can be by gradient using a two solvent system, Solvent A being 25 mM (millimolar) aqueous sodium hydroxide, Solvent B being 100 mM sodium nitrate in Solvent A.

Once the sulfoalkylation reaction is complete and the low residual cyclodextrin end point has been reached, additional hydroxide can be added to destroy residual sultone. The additional hydroxide is typically added in an amount of 0.5 to 3 molar equivalents relative to cyclodextrin and the reaction medium is allowed to continue heating within the range of 65° C. to 95° C., typically for 6 to 15 hours. After residual sultone destruction, the resulting crude product can be additionally treated to produce a final product by being diluted, diafiltered to reduce or rid the product of low molecular weight components such as salts, concentrated, carbon treated, and dried, usually to a level of less than 10% by weight of water based on the dried product.

The invention provides advantages in that the pH is initially monitored to ensure that it remains typically within the range of about 8 to about 11 as the sulfoalkyl ether derivatization reaction proceeds. In this initial stage addition of hydroxide to facilitate the sulfoalkylation is staged or stepwise. By monitoring pH within the range of about 8 to about 11, the course of the reaction can be controlled and monitored such that the entire initial stock of (unsubstituted) cyclodextrin starting material is essentially reacted to the extent of effecting, on average, at least one sulfoalkyl substitution per cyclodextrin molecule. The entire cyclodextrin reactant is thus consumed at the beginning of the process, so that the level of residual (unreacted) cyclodextrin in the crude product is low, relative to the crude product produced by a process which features initially combining the entire stoichiometric or excess amount of base with cyclodextrin and alkyl sultone and allowing the reaction to proceed uncontrolled. Once the entire charge of cyclodextrin starting material has been initially partially reacted, the remaining hydroxide can be added to drive the reaction to completion by finishing the sulfoalkyl substitution to the pre-determined, desired degree. After the initial charge of cyclodextrin has been consumed in the first pH-controlled phase, the rate of hydroxide addition is not believed to be critical, although it is preferred that the pH of the reaction be maintained above about 12 so that the rate of reaction is commercially useful. The hydroxide can be added (e.g., as a solution) continuously or in discrete stages.

Another advantage of initial pH control is the reduction of certain by-products. It is noted that acid is produced as a result of the sulfoalkylation and that the pH tends to decrease as the reaction proceeds. On one hand, the reaction must be maintained basic since if the reaction medium is allowed to become too acidic the reaction will stop. Accordingly, it is preferred to maintain the pH of the reaction medium at a level of at least 8 by adding aqueous hydroxide as needed. On the other hand, if the pH is allowed to exceed a certain level, somewhere about the level of 11, then the reaction starts to produce a high level of the by-products 4-hydroxyalkylsulfonate and bis-sulfoalkyl ether, thus consuming alkylsultone. By initially monitoring pH and maintaining it within the range of 8 to 11, as opposed to simply providing the full charge of hydroxide at the start of the reaction, the reaction proceeds while producing a relatively low level of by-products and a relatively clean reaction mixture containing relatively low levels of the aforementioned by-products. At this point, residual (unreacted) alkylsultone levels can still be high, however.

Reference above to a reactant being provided in an amount which is "stoichiometrically sufficient", or the like, is with respect to the amount of reactant needed to fully derivatize the cyclodextrin of interest to a desired degree of substitution.

The phrase "alkali metal hydroxide" as used herein generally means lithium hydroxide, sodium hydroxide, or potassium hydroxide. If it is desired to produce a product suitable for parenteral administration, sodium hydroxide is preferred. The degree of susbstitution can be controlled by using correspondingly lower or higher amounts of alkyl sultone depending upon whether a lower or higher degree of sub-stitution is desired. Generally the range of susbstitution that can be achieved is an average of from 4.5 to 7.5, preferably 5.5 to 7.5, most preferably 6.0 to 7.1.

The crude product of the above-described process, i.e. the product obtained following residual alkylsultone destruction, contains a lower level of residual cyclodextrin than that produced by a process in which the base is initially added in a single charge, and is provided as a further feature of the invention. The crude product produced by the process of this invention typically contains less than 0.5% by weight residual cyclodextrin, preferably less than 0.1%. As explained below, the crude product is also advantageous in that it contains very low residual alkylsultone levels.

Typically the crude aqueous cyclodextrin product solution obtained following residual alkylsultone destruction is purified by ultrafiltration, a process well known to the art in which the crude product is contacted with a semipermeable ultrafiltration membrane that passes low molecular weight impurities through the membrane. The molecular weight of the impurities passed through the membrane depends on the molecular weight cutoff for the membrane. For the instant invention a membrane having a molecular weight cutoff of 1,000 is typically employed. The desired product which is in the retentate is typically further treated with carbon powder to remove colors and further reduce any remaining impurities. The crude aqueous cyclodextrin product solution (i.e., obtained after residual alkyl sultone destruction but before purification) is advantageous in that it contains less than 20 ppm residual alkyl sultone based on the weight of the solution, preferably less than 8 ppm, more preferably less than 4 ppm. It is most preferred that the crude solution contain essentially no residual alkyl sultone.

A final, commercial product can be isolated at this point by filtration to remove the carbon, followed by evaporation of the water by any conventional process such as simple distillation, spray dying, or, preferably, lyophilization. The final product produced by the instant invention also advantageously contain very low residual levels of alkyl sultone, less than 25 ppm based on the weight of the dry (i.e., containing less than 10% by weight water) final product, preferably less than 10 ppm, and more preferably less than 5 ppm. It is most preferred that the final product contain essentially no residual alkyl suftone. The final product containing less than 25 ppm of alkyl sultone is accordingly provided as an additional feature of the invention. The sultone is reduced following completion of the sulfoalkylation to the desired degree of substitution by an alkaline hydrolysis treatment as previously described, i.e., by adding extra hydroxide solution in an amount and under conditions sufficient to reduce the amount of unreacted sultone in the dry product to the desired level below 25 ppm, preferably less than 10 ppm, most preferably less than 5 ppm. This basic alkaline hydrolysis step is constituted by step (D) in the preferred embodiment.

Unsubstituted α-, β-, and γ-cyclodextrins can be used as starting materials for derivatizing into sulfoalkyl ether cydodextrins with this invention. The present invention is preferred for use with β-cyclodextrin.

($C_2$–$C_6$alkyl)sultones can be used in the invention. A preferred alkyl sultone for use as a sulfoalkylating agent is 1,4-butane sultone.

The invention is further disclosed and illustrated by the following examples, which are not to be construed as limiting the scope of this invention.

EXAMPLE 1

This example illustrates the invention on a several hundred gram scale. Note "UF" means ultrafiltration.

| 1. Reaction Scale and Stoichiometry of Reagents: | | | |
|---|---|---|---|
| | Wt(g) | Moles | Molar Ratio |
| β-cyclodextrin | 400.0 | 0.3137 | 1 |
| (contains 11% moisture) | 356.0 dry | | |
| NaOH | 131.7 | 3.2939 | 10.5 |
| 1,4-Butane Sultone | 341.3 | 2.5096 | 8.0 |
| HCl | As needed | | |

-continued

1. Reaction Scale and Stoichiometry of Reagents:

|  | Wt(g) | Moles | Molar Ratio |
|---|---|---|---|
| Equipment: |  |  |  |
| Reactor | 3 L RB Flask |  |  |
| UF Unit | 15 sq. ft, 1000 nominal molecular weight cutoff (MWCO) Cellulose Membrane, spiral wound from Millipore, Inc. |  |  |

2. Procedure:

In a 3 lit reaction flask, 652.4 g of 12.5% (2.038 moles) of aqueous NaOH was charged followed by 400 g β-cyclodextrin (0.3137 moles). The mixture was heated to dissolve β-Cyclodextrin (β-CD) and brought to 70° C. with stirring. pH of the resulting solution was above 12. To this, 341.3 g (2.5096 moles) of 1,4-butane sultone was slowly added over 20–30 minute period. The alkylation reaction, as expected, was exothermic and the temperature rose to 90° C. and pH began to drop. An addition funnel containing 250.9 g of 12.5% (0.7841 moles) NaOH was set up and the reaction mixture was then allowed to stir at 70° C. for 1 hour and 44 minutes. During this time, the pH was maintained in the range of 9–10 with the slow addition of 22.9 g of 12.5% (0.716 moles) NaOH from the addition funnel. At the end of this time period, the remaining 228.0 g 12.5% (0.7125 moles) NaOH was added and the reaction was continued at 70° C. for about 6 hours, after which the β-CD concentration was confirmed to be less than 0.1% in the reaction mixture. An additional 75.2 g of 25% (0.470 moles) NaOH was added and the reaction was allowed to continue at 70° C. for about 17 hours to destroy the unreacted sultone to below 10 ppm in the reaction mixture. The crude reaction mixture was neutralized with concentrated HCl to pH of 7. The material was stored at below 5° C. until ultrafiltration (UF) processing.

The crude reaction mixture was diluted with water to 14 kg in a stainless steel pressure vessel and ultrafiltered on a Millipore 15 sq.ft unit to purge (in the permeate) the reaction by products such as NaCl, $HO(CH_2)_4SO_3Na$, bis-sulfobutyl ether and other low molecular weight species. The diafiltration was continued until the chloride concentration in the permeate dropped to less than 30 ppm as tested by $AgNO_3$ reagent. The product solution was further concentrated to 10 kg weight. The UF concentrate was treated with 28 g Darco KBB carbon and filtered through 1.0 μm (precoated with celite super cell) followed by 0.22 μm filters. The carbon treatment flask and filter cakes were rinsed with water and combined with the filtrate. The resulting solution weight was 11.8 kg A 5.9 kg portion of this carbon treated material was evaporated on a Büchi apparatus to give 293 g of β-cyclodextrin sulfobutyl ether (β-CDSBE). The overall process yield was 82.5%. The average degree of substitution was 6.7 by the elemental analysis, 6.7 by Capillary Zone Electrophoresis and 6.2 by NMR. The material had less than 0.025% β-cyclodextrin and less than 10 ppm sultone. Actually neither of these two were detected, results being expressed at the lowest detection limit.

EXAMPLE 2

This example illustrates the invention on a several kilogram scale.

By a procedure similar to the one described in example 1, the reaction, cleanup and purification was carried out on 4 kg scale yielding 4.3 kg of β-CDSBE at 65% yield. The average degree of substitution was 6.5 by the elemental analysis, 6.6 by Capillary Zone Electrophoresis and 6.4 by NMR. The material had less than 0.025% β-cyclododextrin and less than 10 ppm sultone (again, neither was detected). In this example, low pyrogen (containing less than 0.25 endotoxins units/ml) water was used for all of the steps. The material was of parenteral grade quality.

EXAMPLE 3

This example illustrates the invention on a large scale.

By a procedure similar to the one described in example 1, alkylation of β-CD (93.3 kgs) using eight molar equivalents of 1,4-butane sultone (80 kgs) was carried out under basic pH conditions in a 100 gallon stainless steel reactor.

The solution (about 100 gallons) was filtered through an in-line 10 micron depth filter to remove residual particulate material, and the filtered solution added directly to about 700 gallons of depyrogenated water. Subsequent diafiltration (1,000 MWCO spiral wound membranes) using 1900 gallons of depyrogenated water was then used to purge low molecular weight reaction impurities and inorganic ions. The β-CD retentate (about 525 gallons) was confirmed as having less than 10 ppm residual chloride ion content.

Batch carbon treatment for 2 hours (with ~9% w/w Darco KBB) was then used to remove color bodies and reduce pyrogen content of the β-CDSBE stream. The carbon-treated stream was initially filtered through a Nutsche filter pre-coated with body-aid, followed by a 0.65 and 0.2 micron polishing filters. The β-CDSBE filtrate was subsequently concentrated to a volume of about 90–95 gallons via vacuum evaporation at 65–74° C.

The 30% w/w product solution was filtered through a 0.65 and 0.2 micron in-line filters. The solution was freeze-dried to produce 109.05 kgs of β-CDSBE at overall process yield of 68.2%. The average degree of substitution was 6.5 by Capillary Zone Electrophoresis method. The material was suitable for use in parenteral grade formulation.

EXAMPLE 4

By a procedure simijar to the one described in example 1, 150 g β-cyclodextrin was dissolved in 203 g 12% NaOH solution (5.2 molar equivalent) and alkylated with 79.8 g sultone (8 molar equivalent). The product was isolated as described above. The average degree of substitution was 4.9 by NMR and Capillary Zone Electrophoresis methods and the residual β-CD was 0.35% in β-CDSBE. The process yield was 53%.

EXAMPLE 5

Sulfobutyl ether β-cyclodextrin, produced by the method of Example #3 in U.S. Pat. No. 5,134,127, was analyzed for residual unreacted alkyl sultone content. The residual level of sultone in the crude reaction product was 1100 ppm, measured by capillary gas chromatography using a flexible quartz capillary column (25 m×).32 mm i.d. with 0.5 micron coating of 14% cyanopropylphenyl, 86% dimethyl siloxane, available as BP-10 from Scientific Glass Engineering Ltd, UK).

The crude product solution was treated by dialfiltration/ultrafiltration, then carbon treated and the water removed by rotary evaporation. The average degree of substitution was 7.0 by NMR and 7.1 by elemental analysis (c/s ratio). Residual sultone levels, measured by the same capillary GC method, were measured at 1800 ppm.

What is claimed is:

1. A process of making an aqueous sulfoalkyl ether cyclodextrin solution having a predetermnined degree of substitution, comprising the steps of combining in an aqueous reaction medium an unsubstituted cyclodextrin starting material and an alkyl sultone in an amount sufficient to effect said pre-determnined degree of substitution, in the presence of a base to effect sulfoalkylation of said cyclodextrin;

maintaining the pH of the reaction medium basic but at a level less than about 11 during said sulfoalkylation for a time sufficient to consume said cyclodextrin such that residual unreacted cyclodextrin reaches a level of less than 0.5% by weight based on the original weight of unsubstituted cyclodextrin starting material;

adding base in an amount sufficient to effect completion of said sulfoalkylation; and adding, additional base following said completion, said base being added in an amount and under conditions sufficient to effect destruction of residual alkylsultone to a level less than 20 ppm based on the weight of said solution.

2. A process as defined in claim 1, wherein said residual unreacted level of cyclodextrin is less than 0.1%.

3. A process as defined in claim 1, wherein said base is sodium hydroxide.

4. A process as defined in claim 1, wherein said cyclodextrin is β-cyclodextrin.

5. A process as defined in claim 1, wherein said alkyl sultone is 1,4-butane sultone.

6. A process as defined in claim 1, further comprising purifying the crude product obtained following residual alkylsultone destruction, said purification comprising the steps of diafiltration and carbon treatment.

7. A process of making an aqueous sulfoalkyl ether cyclodextrin solution having a pre-determined degree of substitution, comprising the steps of:

A) combining in an aqueous reaction medium an unsubstituted cyclodextrin starting material with an alkyl sultone in an amount sufficient to effect said pre-determnined degree of substitution, in the presence of an alkali metal hydroxide;

B) conducting sulfoalkylation of said cyclodextrin within a pH range of about 8 to about 11 until residual unreacted cyclodextrin is less than 0.5% by weight, preferably less than 0.1%;

C) adding additional hydroxide in an amount sufficient to achieve said degree of substitution and allowing said sulfoalkylation to proceed to completion; and D) adding additional hydroxide following said completion, said hydroxide being added in an amount and under conditions sufficient to effect destruction of residual alkylsultone to a level less than 20 ppm based on the weight of said solution.

8. A process as defined in claim 7, wherein said residual unreacted level of cyclodextrin is less than 0.1%.

9. A process as defined in claim 7, wherein said alkali metal hydroxide is sodium hydroxide.

10. A process as defined in claim 7, wherein said cyclodextrin is β-cyclodextrin.

11. A process as defined in claim 7, wherein said alkyl sultone is 1,4-butane sultone.

12. A process as defined in claim 7, further comprising purifying the product obtained following residual sultone destruction, said purification comprising the steps of diafiltration, carbon treatment, and carbon removal.

13. A process as defined in claim 12, further comprising the step of drying the product produced thereby.

14. A process as defined in claim 1, wherein said solution contains less than 8 ppm of residual alkylsultone.

15. A process as defined in claim 14, wherein said solution contains less than 4 ppm of residual alkylsultone.

16. A process as defined in claim 7, wherein said solution contains less than 8 ppm of residual alkylsultone.

17. A process as defined in claim 16, wherein said solution contains less than 8 ppm of residual alkylsultone.

* * * * *